Figure 1:
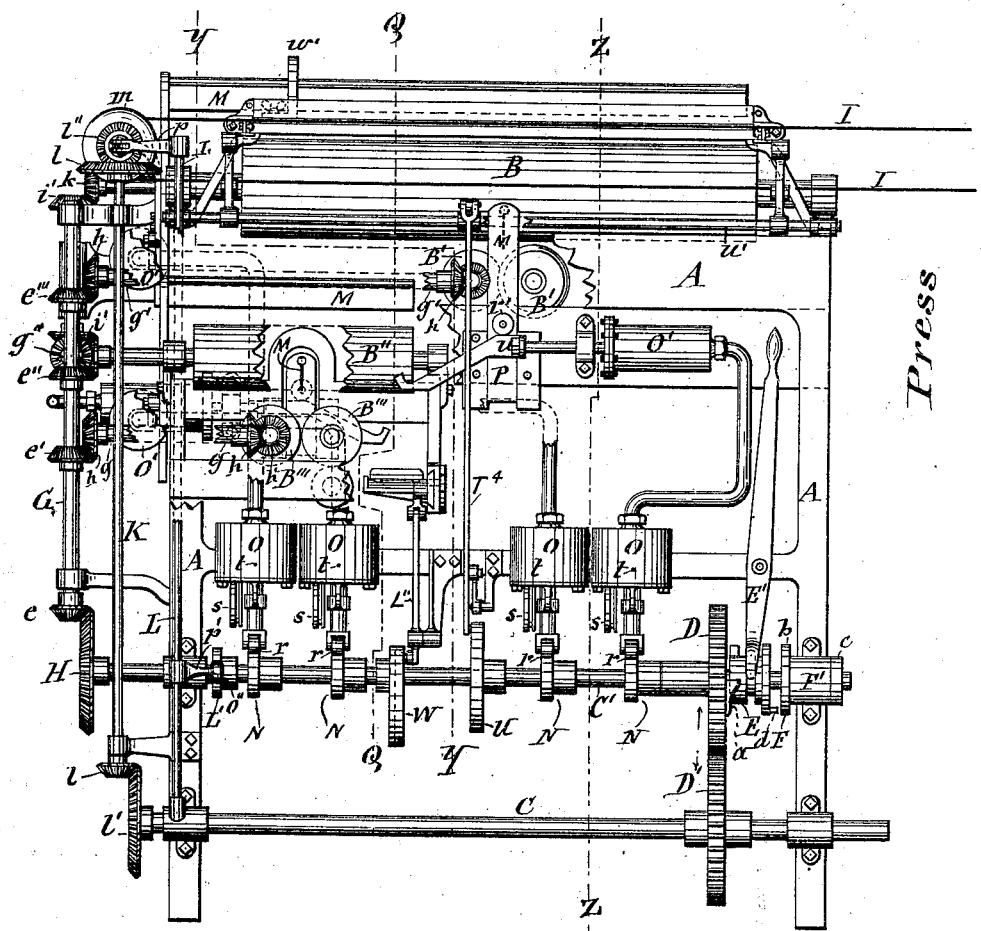

(No Model.) 10 Sheets—Sheet 1.

J. E. TETLEY & J. S. HILL.
PAPER FOLDING MACHINE.

No. 358,174. Patented Feb. 22, 1887.

FIG-1-

ATTEST—
Wm. C. Raymond
C. Bendigou

INVENTORS—
John E. Tetley
Jonathan S. Hill (No Model.) 10 Sheets—Sheet 2.

J. E. TETLEY & J. S. HILL.
PAPER FOLDING MACHINE.

No. 358,174. Patented Feb. 22, 1887.

ATTEST—
Wm. E. Raymond
C. Benedixon

INVENTORS—
John E. Tetley
and Jonathan S. Hill (No Model.)  10 Sheets—Sheet 3.
J. E. TETLEY & J. S. HILL.
PAPER FOLDING MACHINE.
No. 358,174.  Patented Feb. 22, 1887.
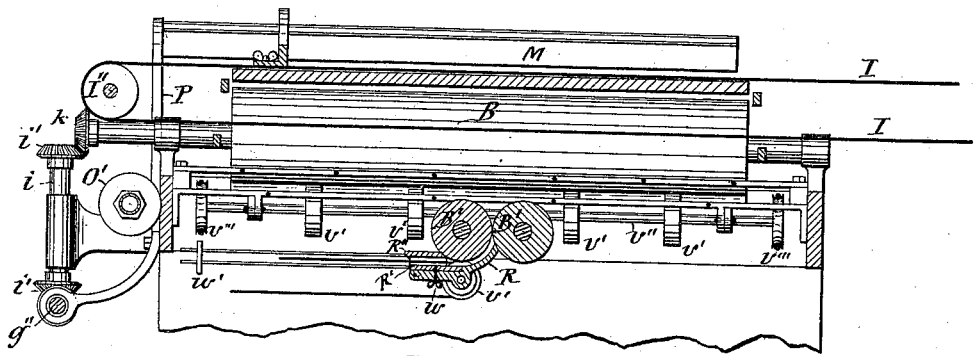
FIG-4-
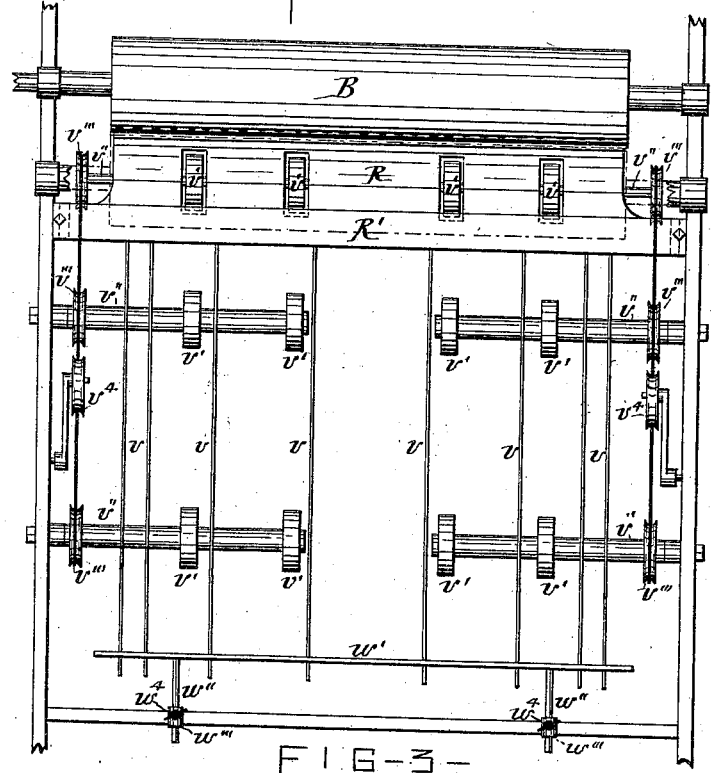
FIG-3-
ATTEST—  INVENTORS—

(No Model.)  10 Sheets—Sheet 4.
J. E. TETLEY & J. S. HILL.
PAPER FOLDING MACHINE.
No. 358,174.  Patented Feb. 22, 1887.
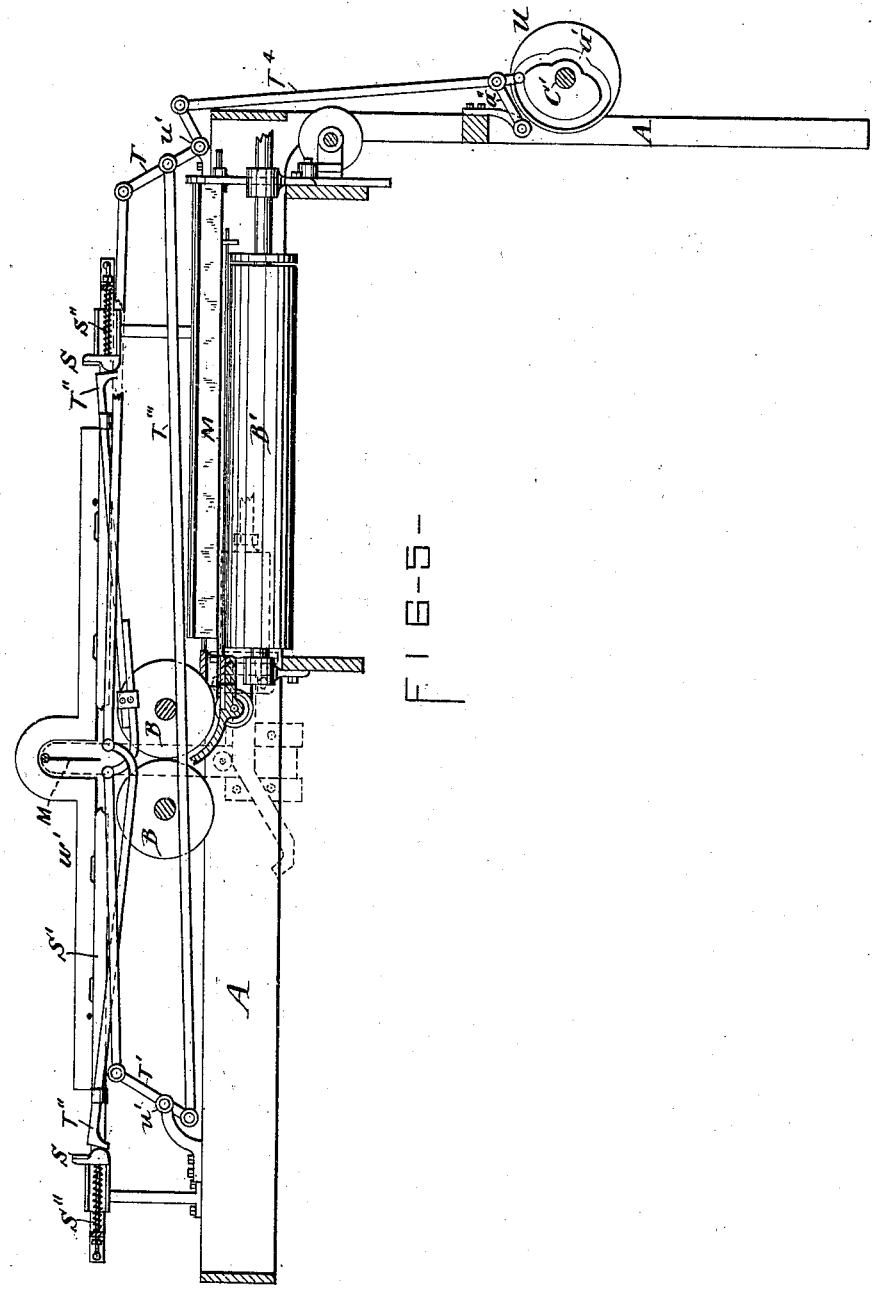
ATTEST—
Wm. C. Raymond
C. Bendixon
INVENTORS—
John E. Tetley
and Jonathan S. Hill
per Duell, Lasser & Hey
Atty.

(No Model.) 10 Sheets—Sheet 5.
J. E. TETLEY & J. S. HILL.
PAPER FOLDING MACHINE.
No. 358,174. Patented Feb. 22, 1887.
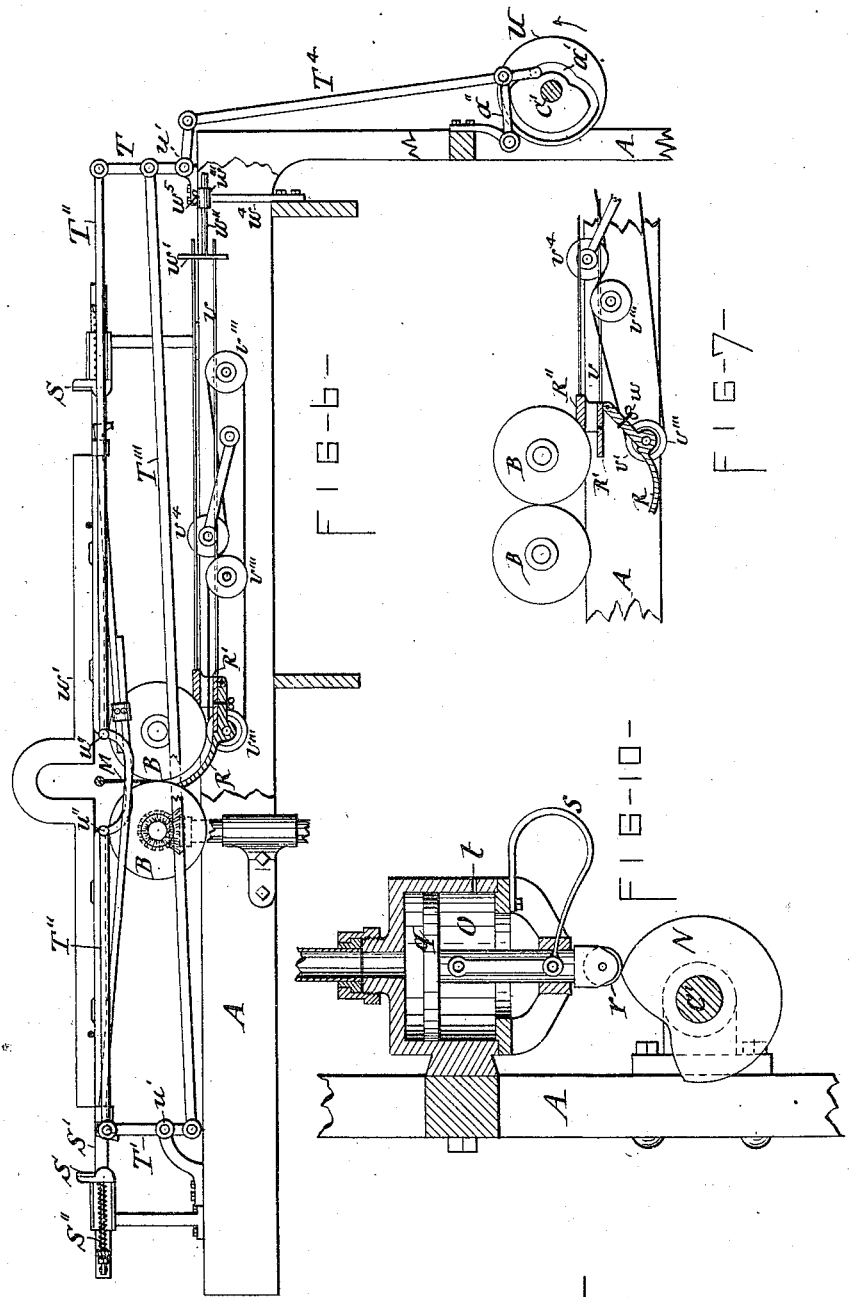
ATTEST—
Wm. C. Raymond
C. Bendixon
INVENTORS
John E. Tetley
and Jonathan S. Hill
per Duell, Laass & Hey
Attys.

(No Model.) 10 Sheets—Sheet 6.
J. E. TETLEY & J. S. HILL.
PAPER FOLDING MACHINE.
No. 358,174. Patented Feb. 22, 1887.
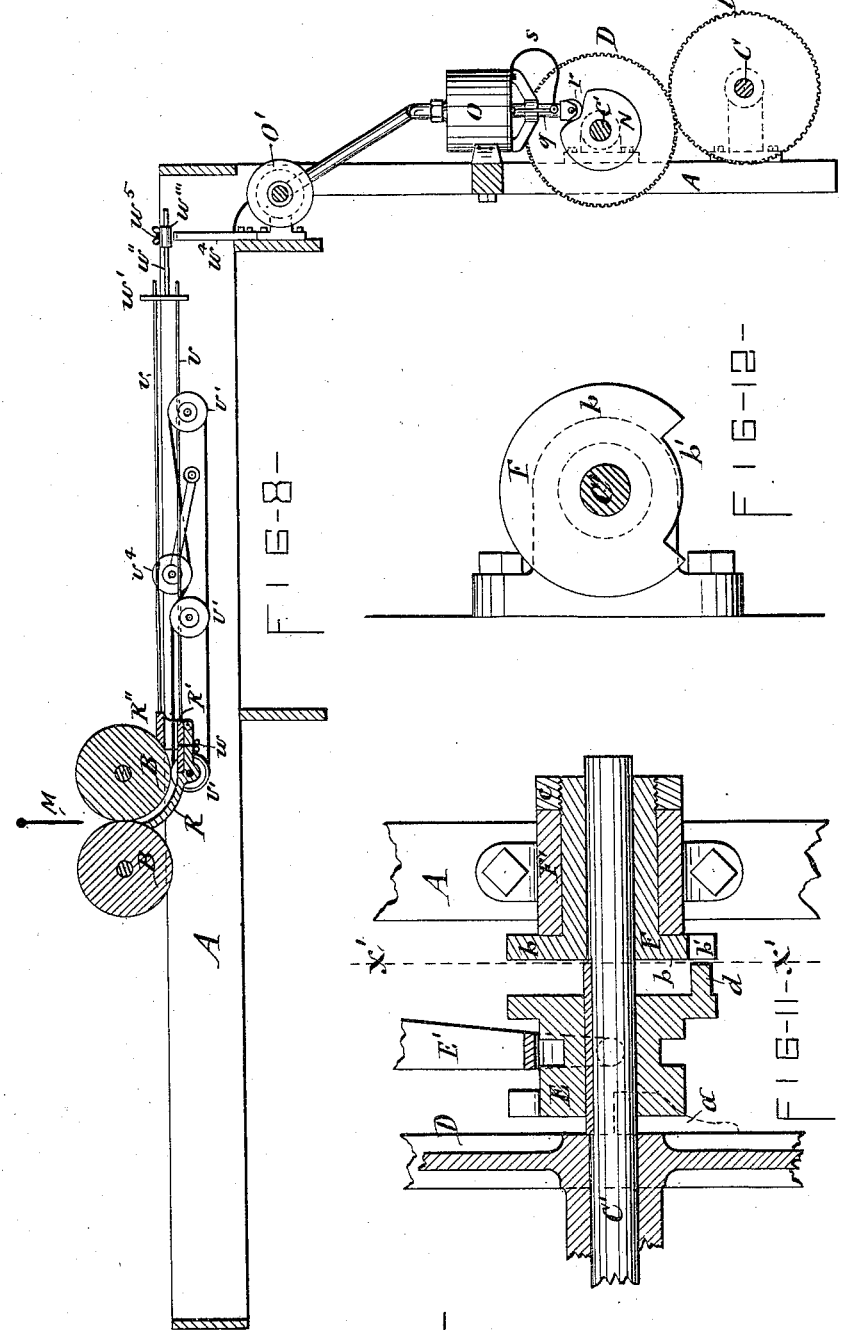
ATTEST—
INVENTORS—

(No Model.) 10 Sheets—Sheet 7.
J. E. TETLEY & J. S. HILL.
PAPER FOLDING MACHINE.
No. 358,174. Patented Feb. 22, 1887.
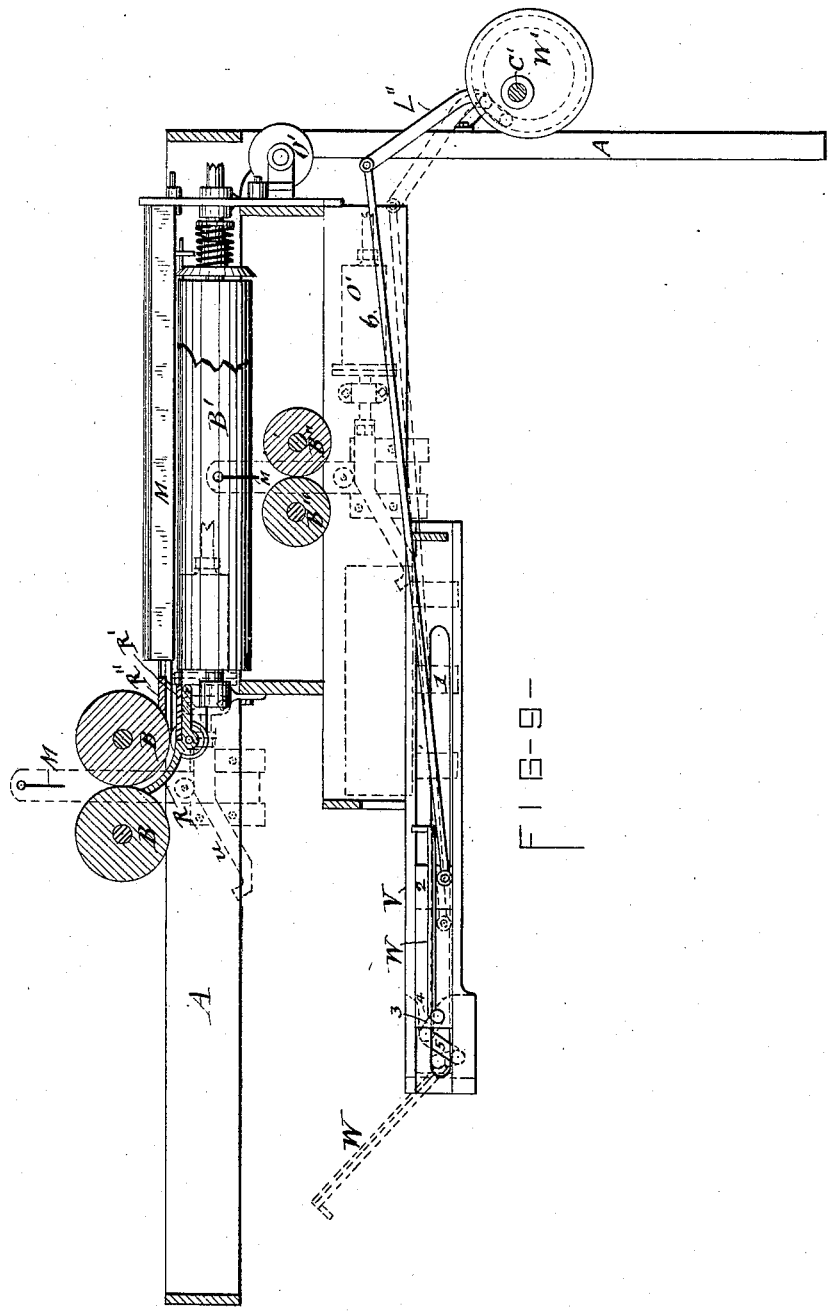
ATTEST—
Wm. C. Raymond
C. Bendixon
INVENTORS—
John E. Tetley
Jonathan S. Hill (No Model.) 10 Sheets—Sheet 8.
J. E. TETLEY & J. S. HILL.
PAPER FOLDING MACHINE.
No. 358,174. Patented Feb. 22, 1887.
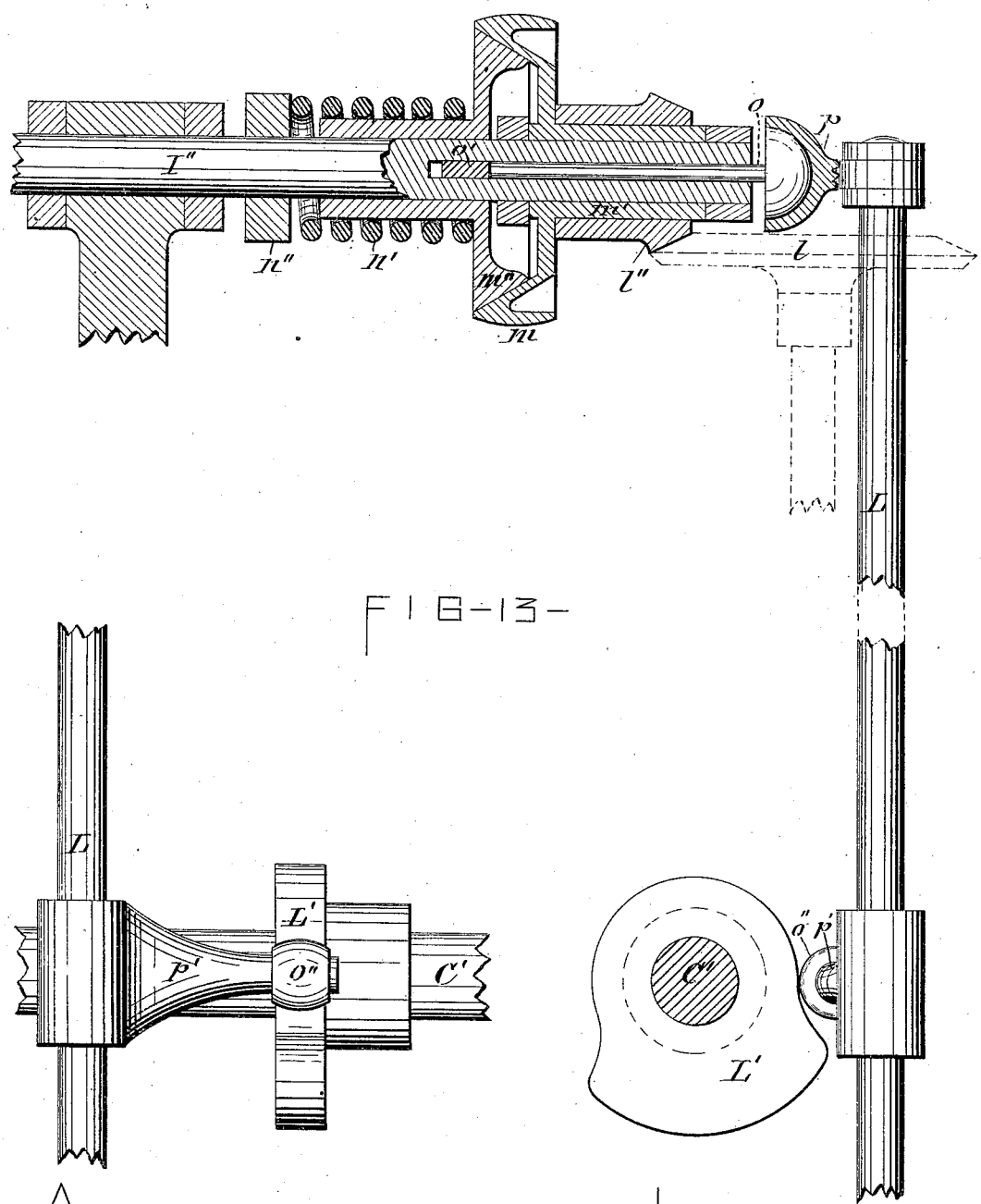
FIG-13-
ATTEST— INVENTORS—

(No Model.) 10 Sheets—Sheet 9.
J. E. TETLEY & J. S. HILL.
PAPER FOLDING MACHINE.
No. 358,174. Patented Feb. 22, 1887.
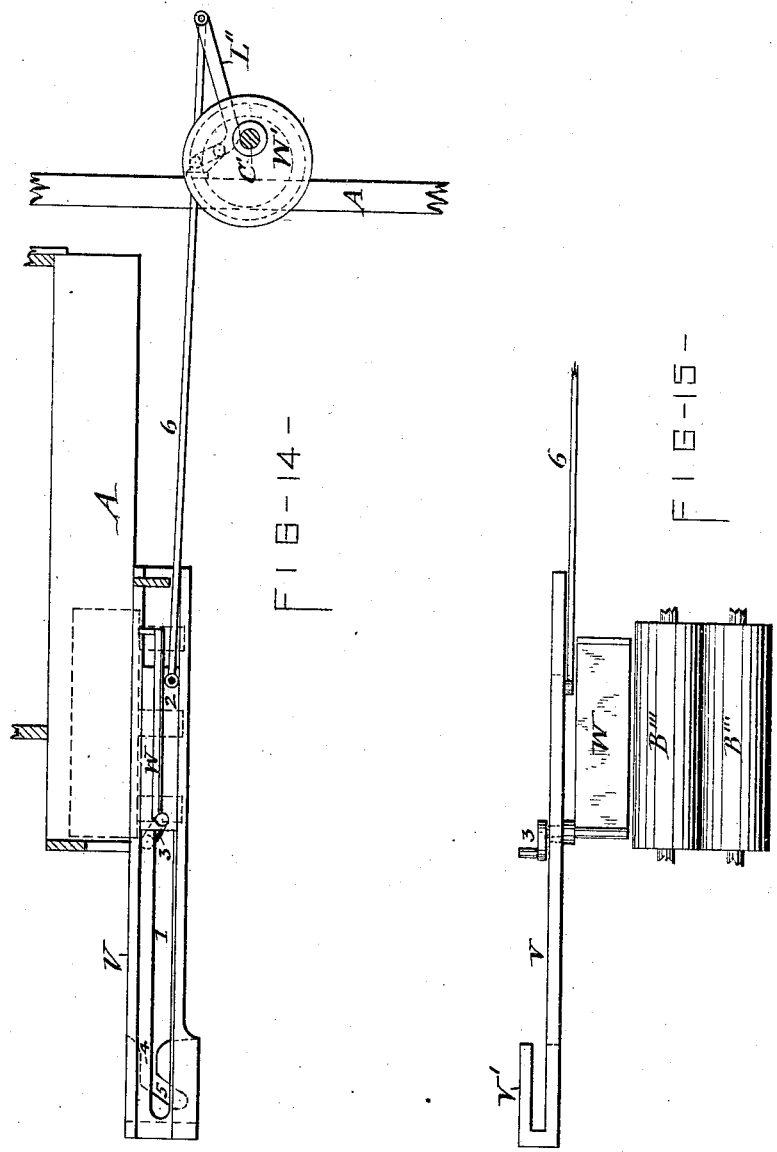

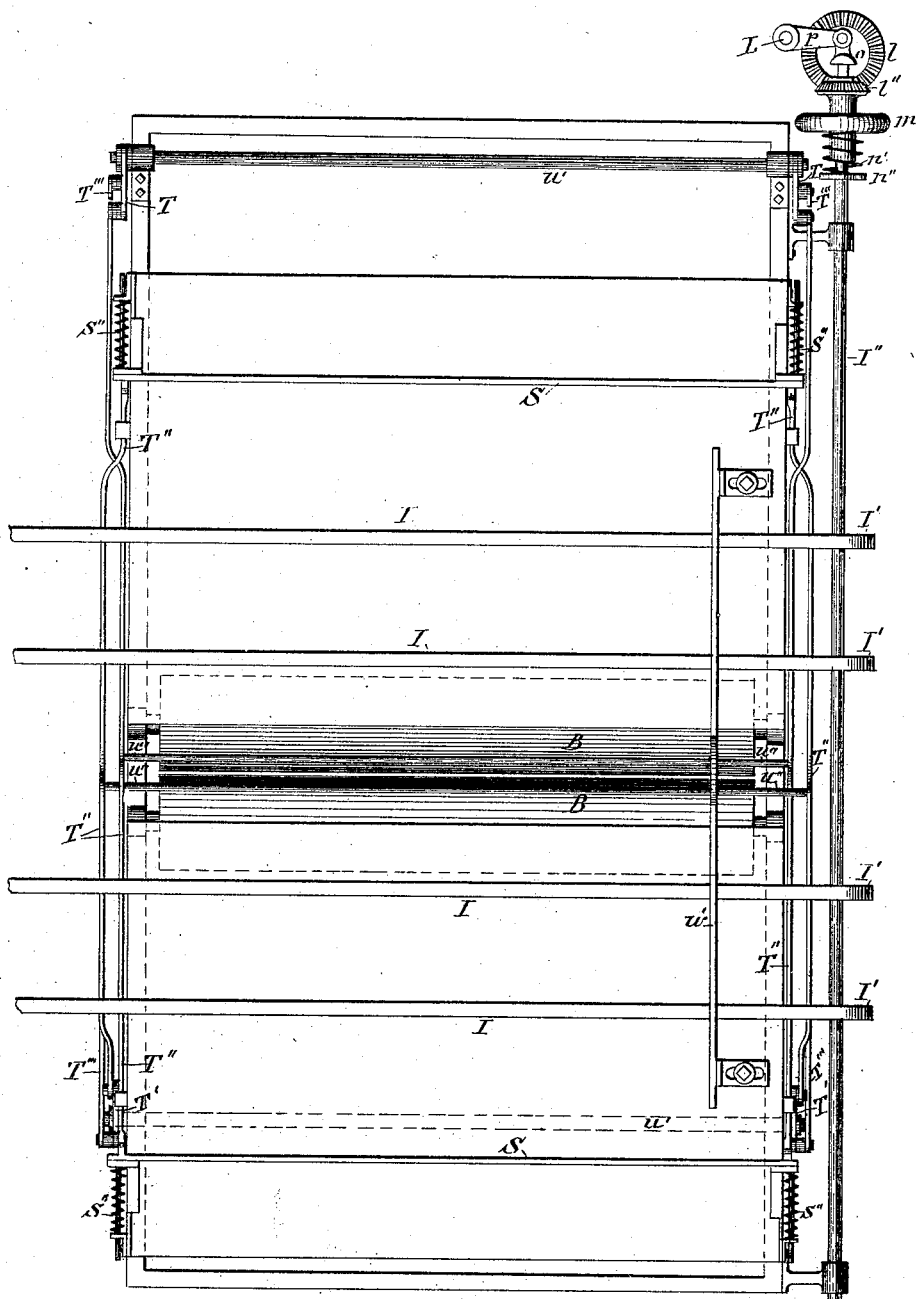

UNITED STATES PATENT OFFICE.

JOHN E. TETLEY AND JONATHAN S. HILL, OF SYRACUSE, ASSIGNORS TO THE EMPIRE FOLDER COMPANY, OF PHŒNIX, NEW YORK.

PAPER-FOLDING MACHINE.

SPECIFICATION forming part of Letters Patent No. 358,174, dated February 22, 1887.

Application filed January 24, 1885. Renewed July 24, 1886. Serial No. 209,027. (No model.)

*To all whom it may concern:*

Be it known that we, JOHN E. TETLEY and JONATHAN S. HILL, of Syracuse, in the county of Onondaga, in the State of New York, have invented new and useful Improvements in Paper-Folding Machines, of which the following, taken in connection with the accompanying drawings, is a full, clear, and exact description.

This invention relates to that class of paper-folding machines which are used in connection with printing-presses, and in which a vertically-reciprocating blade presses across the central portion of the paper and passes the same between revolving rolls, which grip the paper and in drawing it through between the rolls compress the said paper into a folded condition.

The invention consists in certain novel devices for transmitting motion to the folding-blade; also, in novel means for automatically adjusting the paper in its requisite position under the folding-blade; also, in improved devices for guiding the paper from the folding-rolls, which guiding devices are removable to permit of clearing the passage when obstructed by accidental entanglement of the paper.

The invention also consists in a novel construction and arrangement of devices for delivering in a neat manner the folded paper from the machine; and the invention furthermore consists in various auxiliary devices employed in connection with the folding blade and rolls and their actuating mechanism, all as hereinafter more fully described, and specifically set forth in the claims.

Figure 2:
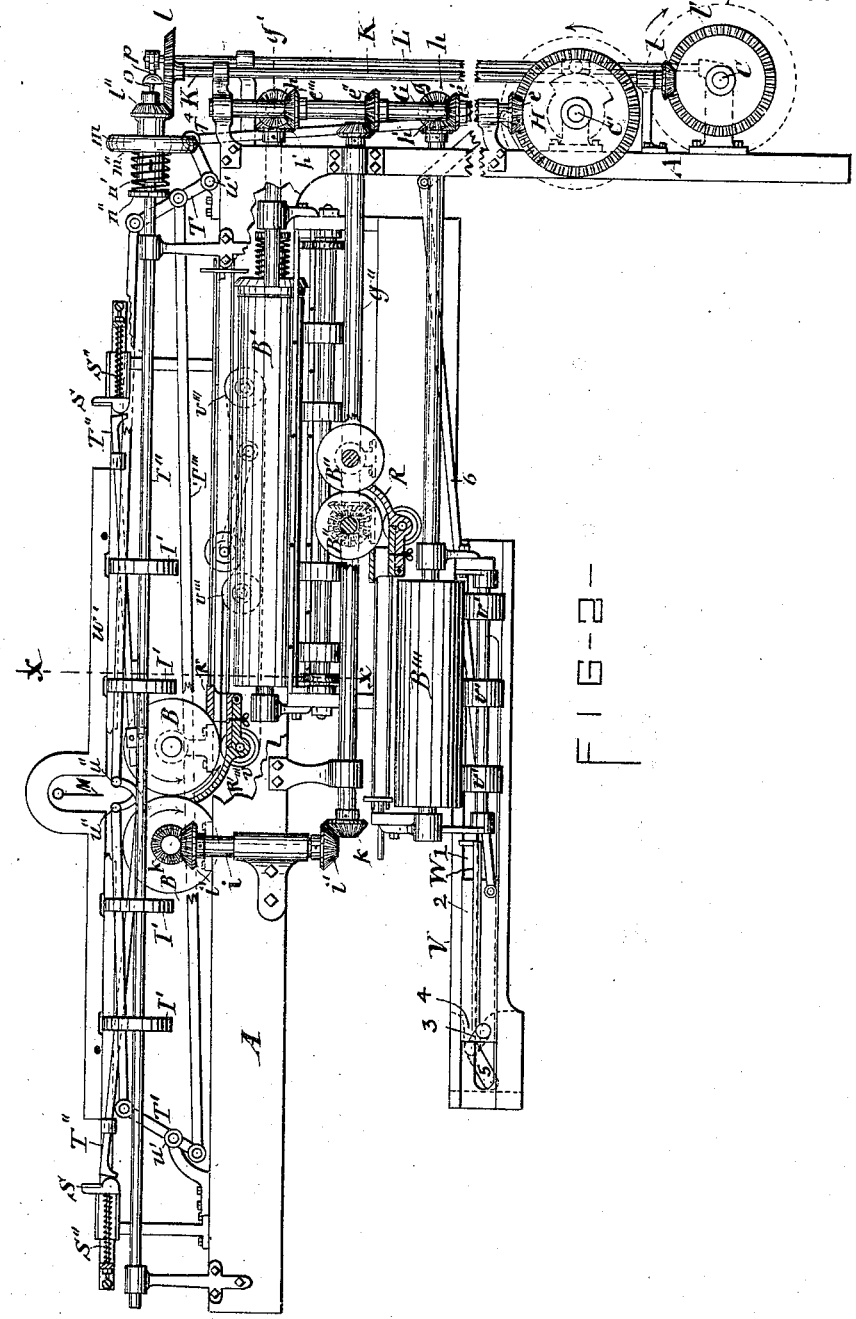

In the accompanying drawings, Figure 1 is a side elevation of our invention. Fig. 2 is an end view of the same with a portion of the frame broken away to better illustrate the salient features of our invention. Fig. 3 is a plan view of one of the sets of folding-rolls and co-operating paper-conveying rolls, one of the folding-rolls being shown in dotted lines, to better show the subjacent concave plate which guides the paper from the folding-rolls. Fig. 4 is a vertical section on line X X in Fig. 2. Fig. 5 is a vertical transverse section on line *y y*, Fig. 1. Fig. 6 is a detail view of the paper-adjusting device, illustrating its operation in conjunction with the folding-blade. Fig. 7 is a detail view of the concave plate which guides the paper from the folding-rolls, and is removable from its operative position to clear the passage of the paper, and carries with it one of the paper-conveying rolls, which is thus thrown out of its operative position automatically with the removal or tripping of the aforesaid concave plate. Fig. 8 is a vertical transverse section on line *z z* in Fig. 1. Fig. 9 is a vertical transverse section on line Q Q, Fig. 1. Fig. 10 is an enlarged detail view of the air-compressing cylinder and its actuating mechanism. Fig. 11 is an enlarged sectional view of the adjustable clutch. Fig. 12 is a transverse section on line X' X', Fig. 11. Fig. 13 is an enlarged detail view of the mechanism for transmitting motion to the traveling tape-carrying pulleys. Fig. 14 is a detail side view of the paper-delivering apparatus in position for receiving the folded paper from the last set of folding-rolls. Fig. 15 is a plan view of the same; and Fig. 16 is a top plan view of the machine, the folding-blade and its actuating mechanism being omitted to avoid confusion.

Similar letters of reference indicate corresponding parts.

A represents the supporting-frame of the folding-machine, said frame extending from the delivery side of a cylinder printing-press. (Not shown, but indicated by the word "press" in Fig. 1 of the drawings.)

B B' B'' B''' designate the folding-rolls, arranged horizontally and in pairs in the usual manner, each succeeding pair being placed in a plane below the preceding pair and at right angles thereto. Said rolls are journaled at their ends in bearings or boxes on the frame A, and receive rotary motion from the driving-shaft C, extended along the lower portion of one side of the frame A and mounted in suitable boxes thereon, as shown in Fig. 1 of the drawings. Above the said driving-shaft is a counter-shaft, C', on which is loosely mounted a gear-wheel, D, which meshes in a spur-wheel, D', fastened on the driving-shaft C. A clutch, E, slides on the shaft C', and is provided internally with a groove by which it engages with a spline on the shaft, as best seen in Fig. 11 of the drawings. The side of the wheel D is provided with a rigid projection or lug, *a*, with which the clutch E is adapted to engage by sliding said clutch toward the wheel, the clutch being shifted by a hand-lever, E', pivoted on the frame A, as shown in Fig. 1 of the drawings. By throwing the clutch into its aforesaid engagement with the wheel D, rotary motion is imparted to the counter-shaft C', and by moving the clutch away from said wheel, so as to clear the lug a, the motion of the counter-shaft is stopped.

Inasmuch as some portions of the machine receive motion from the driving-shaft C by other counter-shafts than the shaft C', it becomes necessary to time the action of the clutch E, so that all parts of the machine shall operate in harmony with each other; and in order to insure this we employ an adjustable gage or guide, F, consisting of a sleeve loosely embracing the shaft C' and extending through a box, F', which is rigidly secured to the frame A. Said sleeve is provided at the end facing the clutch E with a collar, b, having a notch, b', as shown in Figs. 11 and 12 of the drawings. The opposite end of the aforesaid sleeve is screw-threaded and provided with a nut, c. By turning said nut so as to cause it to travel toward the box F' the collar b on the opposite end of the sleeve is drawn tightly against the end of the box, and thus the gage or guide F is clamped in its position. The clutch E has projecting from it a tooth, d, which, by its collision with the collar b, prevents the clutch E from being moved out of engagement with the wheel D; but whenever the tooth comes into coincidence with the notch b' the clutch E is allowed to be shifted to clear itself from the wheel D; hence the position of the notch b' controls the action of the clutch, and consequently the movement of the counter-shaft C'. It will therefore be observed that by turning the gage or guide F and clamping it in its requisite position the movement of the counter-shaft can be so adjusted that the mechanisms which receive motion therefrom act in perfect harmony with the mechanisms which receive motion from the driving-shaft through other shafts, as hereinafter described.

A vertical shaft, G, journaled in brackets secured to the corner of the frame A, has affixed to it at different points of its length a series of bevel-pinions, $e$ $e'$ $e''$ $e'''$, the first of which meshes in a bevel gear-wheel, H, secured to the end of the counter-shaft C'.

From the pinions $e'$ $e'''$ motion is transmitted to the folding-rolls B''' and B' by horizontal shafts $g$ $g'$, provided at each end with a bevel-pinion, $h$, which engage, respectively, with the aforesaid pinions $e'$ and $e'''$ and with bevel-pinions $h'$ $h'$ on the shafts of the folding-rolls. The rolls B'' receive motion from the pinion $e''$ by a horizontal shaft, $g''$, which is extended from the shaft G across the ends of the rolls B'', and is provided with bevel-pinions meshing in the pinion $e''$ and in a pinion on the end of one of the rolls B''. From the shaft $g''$ motion is transmitted to the rolls B B by a vertical shaft, $i$, provided at opposite ends with miter-pinions $i'$ $i'$, which engage with miter-pinions $k$ $k$, respectively, on the end of the shaft $g''$ and on the end of the shaft of one of the rolls B. Respective companion-rolls partake motion from the geared rolls by frictional contact of the convex surfaces.

The paper is conveyed from the printing-press to the uppermost or first set of folding-rolls, B B, by endless tapes I I, carried by rolls or pulleys I' I', which are mounted on shafts I'', only one of which is shown in the annexed drawings. This shaft receives motion from the driving-shaft C by the medium of a vertical shaft, K, which has attached to its two extremities two bevel-gears, $l$ $l$, the lower of which engages a bevel gear-wheel, $l'$, fastened to the end of the driving-shaft, and the upper gear $l$ meshes in a bevel-pinion, $l''$, which is rigidly attached to the hub $m'$ of a clutch-disk, $m$, mounted loosely on the end of the shaft I''.

Collars attached to the shaft at opposite ends of the hub $m'$ serve to confine the hub in its position, so as to maintain the pinion $l''$ in engagement with the gear $l$, as shown in Fig. 13 of the drawings. Another clutch-disk, $m''$, slides on the shaft I'', and is normally held in engagement with the clutch-disk $m$ by a spring, $n'$, interposed between the clutch-disk $m''$ and a collar, $n''$, attached to the aforesaid shaft.

In order to render the movement of the shaft I'' intermittent, so as to stop the traveling tapes I while the paper passes between the folding-rolls B B, we provide the end portion of the shaft I'' with an axial channel and introduce therein a push-bar, o. At the inner end of the aforesaid channel we provide both the shaft I'' and the sliding clutch-disk $m''$ with a transverse slot, in which a key, $o'$, is inserted, as illustrated in Fig. 13 of the drawings, the slot of the shaft being longer than that of the clutch-disk, so as to allow the push-bar $o$ to push the clutch-disk $m''$ away from the clutch-disk $m$ by means of the aforesaid key.

A vertical shaft, L, has projecting from it in opposite directions two arms, $p$ $p'$, one of which has its free end reaching across the end of the push-bar $o$, and the other arm, $p'$, is secured to the lower portion of the shaft L, and has pivoted on its free end a friction-roller, $o''$, which bears on a cam-disk, L', attached to the counter-shaft C', as best seen in Figs. 1 and 13 of the drawings. The pressure of the push-bar against the arm $p$, incident to the pressure of the spring $n'$ on the sliding clutch $m''$, maintains the arm $p'$ in constant contact with the cam-disk L'.

M M M M represent the folding-blades, only one of which is shown in Fig. 2 of the drawings on account of their interference with the illustration of other important features of our invention. Fig. 1, however, illustrates the positions of all the blades, by the breaking away of other parts of the machine. Said blades are arranged directly over and parallel with the two adjacent sides of the respective sets of folding-rolls, and by a vertically-reciprocating movement press the central portion of the paper down between the folding-rolls, which grip the paper and press it into its requisite folded condition. The reciprocating movement of the said folding-blades we obtain by the following instrumentalities, to wit: On the counter-shaft C' are secured a series of cam-wheels, N N, and over each of said cam-wheels is a vertical air-cylinder, O, in which is a piston, $q$, as shown in Fig. 10 of the drawings. The piston-rod thereof projects through the bottom of the cylinder, and has pivoted to its lower end a roller, $r$, by which it rides on the cam-wheel N. A spring, $s$, is arranged to press the piston-rod downward and thus maintain the roller $r$ thereof in contact with the cam-wheel, the latter being of such contour that the rotation of said wheel imparts a reciprocating movement to the piston-rod. The upper end of the cylinder O communicates with one end of another cylinder, O', which is arranged horizontal and has likewise a piston the piston-rod of which projects through the opposite end of the cylinder O', and has secured to its outer end an inclined arm, $u$, as shown in Fig. 1 of the drawings. The folding-blade M is carried on a guide-plate, P, on which is pivoted a roller, $r'$, by which it rides on the arm $u$, aforesaid. The upward pressure of the piston $q$ drives the air from the cylinder O to the secondary cylinder O' and propels the piston of the latter. This movement of the piston causes the inclined arm $u$ to raise the guide-plate P and folding-blade M, connected therewith. The succeeding descent of the piston $q$ draws the air out of the cylinder O', and back into the printing-cylinder O. The resultant vacuum in the secondary cylinder O' causes the piston of the latter to retract. This draws the arm $u$ toward the said cylinder and carries the depressed portion of said arm under the roller $r'$, thereby allowing the guide-plate P, with its folding-blade M, to descend.

To compensate for any loss of air that may occur during its transit from cylinder to cylinder, we provide the side of the cylinder O with a small aperture, $t$, immediately above the piston $q$ when at the bottom of the cylinder. The folding-blade in its descent presses the central portion of the paper between the folding-rolls, which grip the paper and draw the same through between them, the pressure of the rolls serving to press the paper into its requisite folded condition in the usual manner.

In comparing the above description with the annexed drawings, we must call attention to the fact that, owing to the peculiar relative positions of the various folding-rolls and folding-blades, only one set, with its actuating mechanism, is fully illustrated in Figs. 1 and 2 of the drawings; but, inasmuch as they are all substantially alike and certain parts thereof are well known in the state of the art, the foregoing description will enable others to avail themselves of our invention.

Two or more sets of the folding-rolls are provided with the usual cutting-disks on their ends for trimming the edges of the paper. Underneath one of the folding-rolls of each set we arrange a concave plate, R, for guiding the paper from said rolls to the succeeding folding-rolls, to which the paper is conveyed by guide-rods $v$ $v$, (shown more particularly in Fig. 3 of the drawings,) which rods support the paper while it is moved along by rollers $v'$ $v'$, mounted on shafts $v''$, arranged at right angles to the guide-rods, the first of said shafts being journaled on the under side of the concave plate R, which latter is provided with openings, through which a portion of the peripheries of the rollers protrude and impinge the peripheral face of the folding-roll above the concave plate, as shown in Figs. 2, 6, and 8 of the drawings.

The frictional contact of the rollers $v'$, with the revolving folding-roll, imparts rotary motion to the rollers $v'$, and by pulleys $v'''$ on the ends of the shafts $v$ $v$ and a driving-belt connecting said pulleys motion is transmitted to the said shafts and rollers. A tightening-pulley, $v''''$, bearing on the belt between two of the pulleys $v'''$, serves to maintain the belt at a proper tension. The concave plate R we hinge at its lower longitudinal edge to a plate, R', rigidly secured to the frame A, and retain said concave plate in its requisite position under the folding-rolls by means of clamping-screws $w$. By removing or unfastening said screws, the concave plate R can be dropped away from the folding-roll whenever it becomes necessary to obtain access to the space above the concave plate, for removing paper that may have accidentally become entangled. The aforesaid dropping of the concave plate is illustrated in Fig. 7 of the drawings.

It will be observed that when the concave plate is in this dropped position the rollers $v'$, which have their shafts connected with said plate, are thrown out of frictional contact with the folding-roll, and therefore the motion of the several rollers $v'$ $v'$ is stopped simultaneously with the dropping of the concave plate, and thus the propulsion of the entangled paper is prevented. Over the plate R' we arrange a plate, R'', which lies with one edge close to the folding-roll, so as to prevent the paper from rising and following the said roll.

In order to control the movement of the paper, so as to arrest it at the proper time to bring the center of the paper under the folding-blade M, we employ an adjustable head or gage, $w'$, of the form of a bar, through which one end of the respective guide-rods loosely pass, said bar being supported by horizontal arms $w''$ $w''$, which project from the head $w'$ and pass loosely through sockets $w'''$ on the ends of the posts $w''''$, secured to the frame of the machine, as best seen in Figs. 3, 6, and 8 of the drawings. Said arrangement allows the head to be moved to a proper position to arrest the movement of the paper, as aforesaid, and by a set-screw, $w'''''$, connected with the sockets and engaging the arm $w'''$, the head $w'$ is clamped in its requisite position.

For the adjustment of the paper under the first folding-blade, the before-described head $w'$ is employed simply to arrest the movement of the paper. The centering of the paper under the folding-blade is effected by the following instrumentalities, to wit: At opposite sides of the folding-blade, and parallel therewith, are two guides or gages, S S, mounted on ways which are secured to the top of the frame and allow said guides to move a limited distance toward and from the folding-blade M, rods projecting rearward from the guides S and through a lug on the frame, and spiral springs S'' surround said rods between the aforesaid lug and guides S, serving to press said guides toward the folding-blade. Below the guides S S are two horizontal shafts, $u'$ $u'$, on which are secured vertical levers T and T'. To the upper ends of these levers are connected push-bars T'', which reach nearly or quite to the guides S, at the opposite side of the folding-blade M, and have their free ends hung movable on the frame. Near the folding-blade M, at opposite sides thereof and parallel therewith, are two bars, $u''$ $u''$, attached to the push-bars T'', so as to be carried thereby toward and from the folding-blade M. The lever T is attached to the shaft $u'$ at the lower end of said lever, and between the two ends thereof is a rod, T''', connected therewith and extended to and connected with the foot of the other lever, T', which is connected with the shaft $u'$ intermediately between the two ends of said lever. A horizontal arm is fastened to the shaft $u'$, to which the levers T are attached, and to said horizontal arm is connected a downwardly-extended pitman, T'''', which has projecting laterally from its lower extremity a stud-pin, which is extended into a cam-groove, $a'$, in the side of the disk U, fastened to the counter-shaft C'. A link, $a''$, pivoted at one end of the pitman T'''' and at the opposite end on an arm secured to the frame A, serves to maintain the pitman in its connection with the cam-disk U.

The operation of the aforesaid device is as follows, to wit: The cam-disk U, being rotated by the counter-shaft C', imparts a reciprocating motion to the pitman, said motion being rendered intermittent by the peculiar contour of the cam-groove $a'$, which is of the form of two diametrically-opposite disposed segments concentric with the axis of the disk U, but of greatly different radii, one of said segments being near the center of the disk, while the other segment is near the periphery of the disk, as shown in Fig. 6 of the drawings, the two segments being connected at their extremities by eccentrically-described segments. The disk U is so adjusted on the counter-shaft C' that while the paper is being moved over the folding-rolls and to its position under the folding-blade the stud-pin of the pitman travels in the outer or larger concentric segment of the cam-groove $a'$, which lifts the pitman T'''', and by means of the lever T T' and rod T''' causes the push-bars T'' to crowd the two guides S S apart, to permit free movement of the paper to the head or stop $w$, at the same time the said push-bars carry the bars $u''$ $u''$ toward the passage of the folding-blade, so as to occupy the open space underneath said blade and support the central portion of the paper while being moved into the aforesaid position. By the time the paper has arrived at said stop one of the eccentric segments of the cam-groove $a'$ is carried in position to draw the pitman T'''' down, thereby retracting the push-bars T'' and allowing the guides S S to move synchronously a sufficient distance toward the folding-blade M to push the paper into its requisite central position under the said blade. The retraction of the push-bars T'' draws the bars $u''$ $u''$ away from the passage of the folding-blade sufficiently to allow the latter to descend and force the center portion of the paper down between the bars $u''$ $u''$. The inner or smaller concentric segment of the cam-groove $a'$ leaves the aforesaid adjusting mechanisms dormant in their last-described position, while the folding-blade M presses the paper down between the folding-rolls, as illustrated in Fig. 6 of the drawings.

The delivery of the folded paper from the last set of folding-rolls we accomplish by the following instrumentalities, to wit: At the side of the last set of folding-rolls, and at a proper distance therefrom and parallel therewith, is arranged a guide, V, which extends some distance beyond the outer end of the folding-rolls, as shown in Figs. 2, 9, 14, and 15 of the drawings. The guide V consists of two parallel plates placed edgewise vertically and provided with a longitudinal slot, 1, in which slides a block, 2, and on said block is pivoted a rack, W, from the pivoted end of which projects a cranked short arm, 3. On the side of the free end of the guide V is affixed a plate, V', having a flaring guide-groove, 4, having its wide end facing the opposite end of the guide V.

From the small end of the flaring guide-groove 4 extends an inclined guide-groove, 5. The block 2 receives a reciprocating motion from a cam or eccentric, W', mounted on the counter-shaft C'. A lever, L'', pivoted to an arm attached to the frame A, has one end connected with the cam or eccentric W', so as to be actuated thereby. The opposite and longer end of the lever L'' is connected with the sliding block 2 by a rod, 6. The cam or eccentric W' imparts oscillatory motion to the lever L'', and the latter transmits reciprocating motion to the sliding block 2 by the rod 6. The cam or eccentric W' is adjusted on the counter-shaft in such a position in relation to the axis thereof as to cause the sliding block 2 to be retracted and the rack W to be carried in front of the folding-rolls in time to receive the folded paper issuing from between said rolls. As the rack W is carried to the outer or free end of the guide V, the cranked short arm 3 of the rack enters first the flaring guide-groove 4 and then the inclined groove 5, and in the latter movement the free end of the short arm 3 becomes so depressed as to cause it to swing the rack W vertically on its pivot and over into an inverted position, as represented by dotted lines in Fig. 9 of the drawings, thereby depositing the folded paper in a neat manner at the end of the guide V.

Having described our invention, what we claim as new, and desire to secure by Letters Patent, is—

1. In combination with the horizontal folding-rolls, the guide-plate P, arranged vertically at the end of said rolls, the folding-blade attached to the said guide-plate, the roller $r'$, pivoted on the plate P, and the reciprocating inclined arm $u$, extending under said roller, substantially in the manner described and shown.

2. In combination with the folding-blade M, guide-plate P, and the roller $r'$, pivoted on said plate, an air-cylinder provided with a piston, and an inclined arm, $u$, extended under the roller and actuated by the aforesaid piston, as set forth.

3. In combination with the folding-blade M, guide-plate P, and the roller $r'$, pivoted on said plate, the cylinder O, provided with the piston $q$, the cylinder O', communicating with the cylinder O and provided with a piston, and the inclined arm $u$, connected to the piston-rod of the cylinder O' and extended under the roller $r'$, substantially as described and shown.

4. In combination with the cylinder O, the piston $q$, the roller $r$, pivoted on the piston-rod, the cam N under said roller, and the spring $s$, holding the roller on the cam, substantially as described and shown.

5. In combination with the shaft C' and wheel D, mounted loosely thereon, the gage F, provided with the notch $b'$ and adapted to be turned on its axis and clamped adjustably in its position, and the clutch E, adapted to engage the wheel D, and having the tooth $d$, adapted to enter the notch $b'$, substantially as described and shown.

6. In combination with the folding-rolls, the shafts $v''$ $v''$ $v''$, rollers $v'$ $v'$, secured to said shafts, the rollers of the first shaft being held in contact with the folding-roll, pulleys $v'''$ on the respective shafts $v''$, a driving-belt connecting said pulleys, and the tightener $v''''$, all combined to operate as specified and shown.

7. In combination with the folding-rolls, the concave plate R, arranged under said rolls and provided with apertures, the shafts $v''$ $v''$ $v''$, rollers $v'$ $v'$ on said shafts, the first set of said rolls protruding through the concave plate R, pulleys $v'''$ on the respective shafts $v''$, a driving-belt connecting said pulleys, and the tightener $v''''$, all as set forth and shown.

8. In combination with the folding-rolls, the concave plate R, hinged at its lower edge and provided with apertures, the clamping-screws $w$, for holding said plate in position, the shafts $v''$ $v''$ $v''$, rollers $v'$ $v'$ on said shafts, the first shaft being journaled on the concave plate and having its rollers protruding through the apertures thereof and in contact with the folding-roll, pulleys $v'''$ on the respective shafts, and the tightener $v''''$ between two of said pulleys, the whole arranged to stop the motion of the rollers $v'$ automatically with the dropping of the concave plate away from the folding-roll, substantially as specified and shown.

9. In combination with the folding-rolls and folding-blade, the push-bars T'', guides S, springs S'', and the bars $u''$, attached to the respective sets of push-bars at opposite sides of the passage of the folding-blade, substantially as described and shown.

10. In combination with the folding-rolls and folding-blade, the guides S S, springs S'' supporting said guides at opposite sides of the folding-blade, and push-bars for pressing said guides outward from the folding-blade, as and for the purpose set forth.

11. In combination with the folding-rolls and folding-blade, the guides S S, springs S'', supporting said guides at opposite sides of the folding-blade, push-bars for pressing said guides outward from the folding-blade, levers for operating said push-bars, and mechanism for transmitting motion from the driving-shaft to the levers, substantially as set forth and shown.

12. In combination with the folding-rolls and folding-blade, the guides S S, springs S'', supporting said guides in their position, the push-bars T'' T'', levers T T', rod T''', connecting said levers, and mechanism for transmitting motion from the driving-shaft to the lever T, substantially as set forth.

13. In combination with the folding-rolls and folding-blade, the guides S S, springs S'', supporting said guides in their position, the push-bars T'' T'', levers T T', rod T''', connecting said levers, the cam-disk U, and the pitman T'''', for transmitting motion from the cam-disk to the lever T, substantially as described and shown.

14. In combination with the folding-rolls and folding-blade, the guides S S, springs S'', supporting said guides in their position, the push-bars T'' T'', levers T T', rod T''', connecting said levers, the disk U, having the cam-groove $a'$, formed of two concentric segments of different radii, and two eccentric segments connecting the two concentric segments, and the pitman T'''', connected with said cam-groove and arranged to transmit motion to the lever T, substantially in the manner specified and shown.

15. In combination with the folding-rolls, folding-blade, shaft I'', and tape-rollers I', mounted thereon, a gear mounted loosely on said shaft, gears for transmitting motion from the driving-shaft to the gear of the shaft I'', and a clutch for transmitting motion to the shaft I'' from its loose gear, substantially as set forth.

16. The combination of the shaft I'', provided in its end with an axial channel, the pinion l'', mounted loosely on said shaft and provided with the clutch-disk m, the clutch-disk m'', connected with the shaft by a key passing transversely through the hub of said disk and through an elongated seat in the shaft, the spring n', pressing the clutch-disks into engagement, the push-bar o, sliding in the axial channel of the shaft, the shaft L, arms p and p', projecting in opposite directions from said shaft, and the cam-wheel L', mounted on the shaft C, substantially as described and shown.

In testimony whereof we have hereunto signed our names and affixed our seals, in the presence of two attesting witnesses, at Syracuse, in the county of Onondaga, in the State of New York, this 15th day of January, 1885.

JOHN E. TETLEY. [L. S.]
JONATHAN S. HILL. [L. S.]

Witnesses:
FREDERICK H. GIBBS,
C. BENDIXON.